March 13, 1934.  W. McMILLAN  1,950,927
FLEXIBLE COVER FOR VEHICLES
Filed July 8, 1930  3 Sheets-Sheet 1
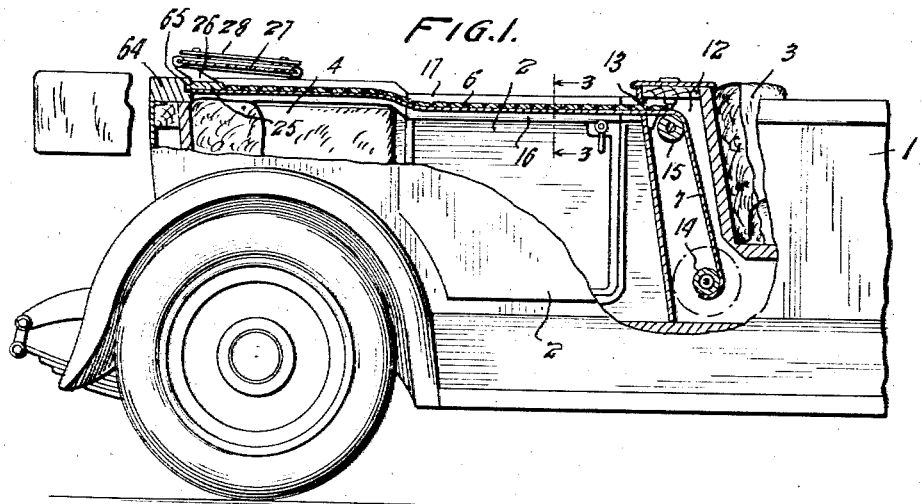
Inventor
WILLIAM McMILLAN
By Semmes & Semmes
Attorneys March 13, 1934.  W. McMILLAN  1,950,927
FLEXIBLE COVER FOR VEHICLES
Filed July 8, 1930  3 Sheets-Sheet 2
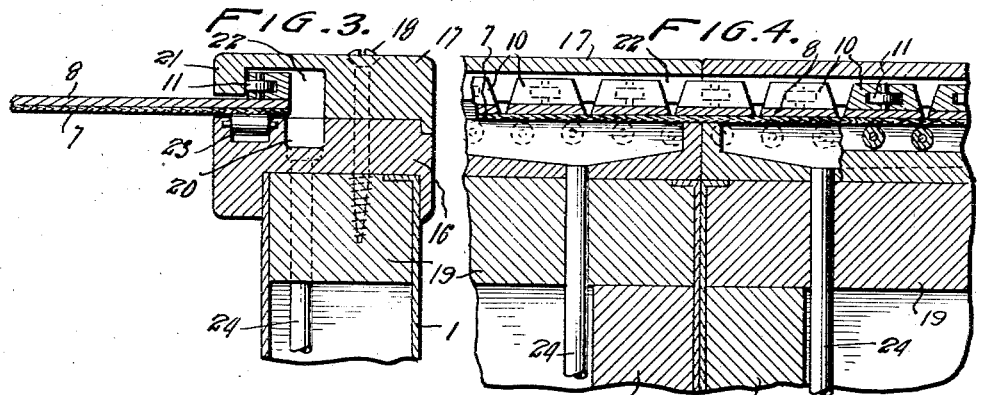
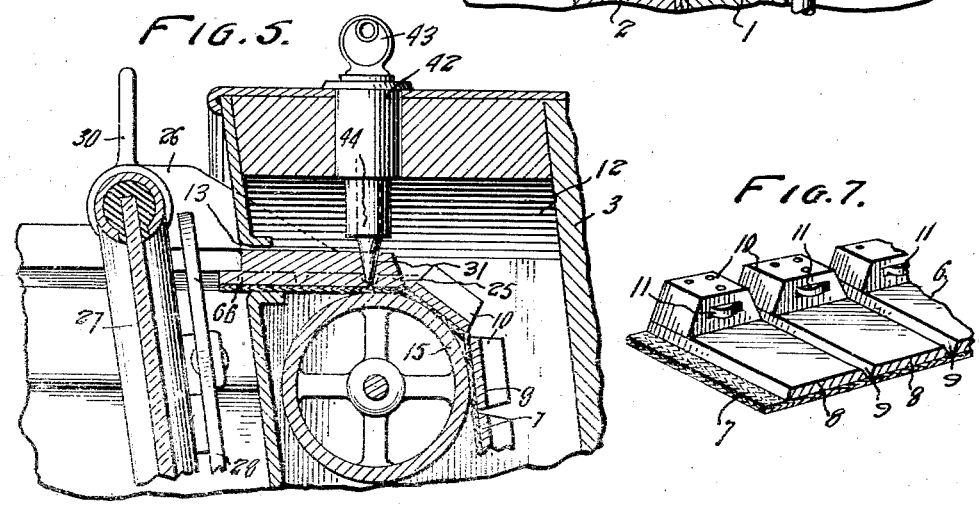
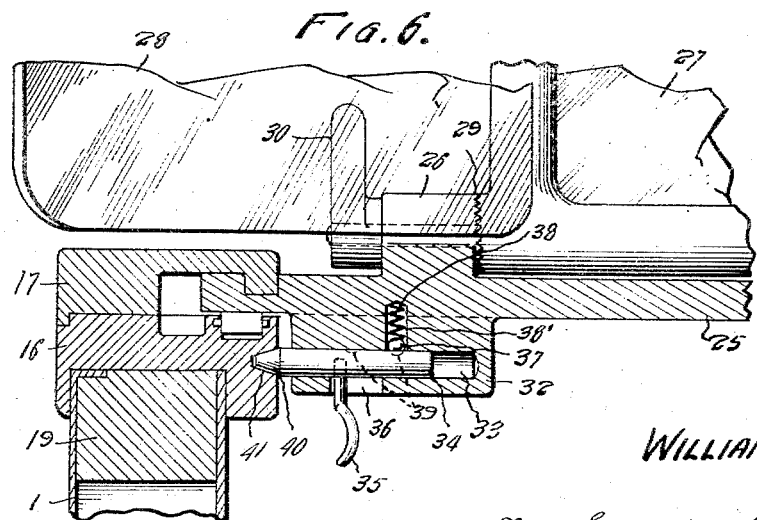
Inventor
WILLIAM McMILLAN
By Semmes & Semmes
Attorneys March 13, 1934.  W. McMILLAN  1,950,927
FLEXIBLE COVER FOR VEHICLES
Filed July 8, 1930  3 Sheets-Sheet 3
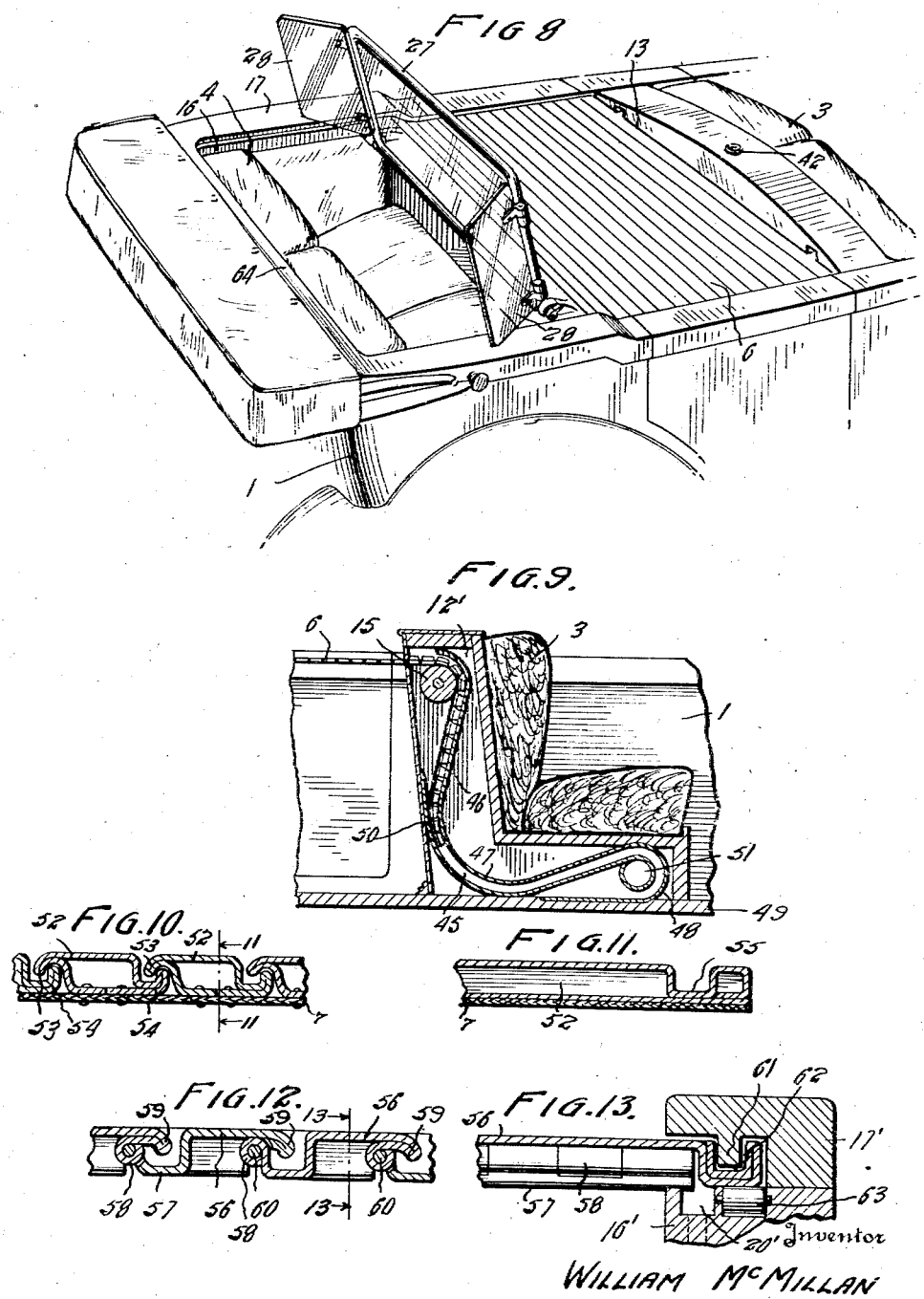
Inventor
WILLIAM McMILLAN
By Semmes & Semmes
Attorneys Patented Mar. 13, 1934

1,950,927

UNITED STATES PATENT OFFICE 1,950,927

FLEXIBLE COVER FOR VEHICLES

William McMillan, Baltimore, Md.

Application July 8, 1930, Serial No. 466,507

5 Claims. (Cl. 296—1)

The invention relates in general to vehicles of the so-called open type, and more particularly has reference to a flexible cover for a compartment thereof so that it may be entirely closed off from the remainder of the vehicle.

In open types of vehicles such as touring cars and sightseeing buses, as well as open trucks, it has been the general practice, when a cover is employed to close off the rear compartment thereof, to make use of canvas or tarpaulin which is stretched over the upper edges of the body and covers the interior thereof. This strip of waterproof material is secured at its sides and ends to the body of the vehicle. Such practice, while affording a waterproof cover, possesses the disadvantage that it is not readily available for immediate use, and moreover the compartment of the vehicle which it covers may not be locked so as to prevent entrance therein.

Some attempts have been made to associate flexible covers, in the form similar to that of a roll top desk cover, with the compartments of a vehicle. While such constructions provide means for covering the compartment with which it is associated, the art has failed to develop them to such an extent that, when they are associated with vehicles having doors these will be locked, when the covering is extended.

The major object of this invention is the provision of a novel flexible cover for a compartment of a vehicle which lacks the inherent disadvantages of constructions heretofore employed.

An equally important object of the invention is the association with an open type vehicle body of a flexible covering for a compartment thereof, the cover when extended being adapted to maintain the doors of the body in closed position, and means being provided for locking the movement of the cover.

Another object of the invention is the designing of a flexible cover comprising a flexible strip of waterproof material having a plurality of ribs positioned thereon, the covering adapted to be associated with a vehicle of the open body type so that the interior of the body may be closed off by the cover and entrance therein prevented.

Still another object of the invention is the association with an open type vehicle body provided with mouldings forming a guideway along the top of its sides of a flexible cover for a compartment thereof, normally maintained in a collapsed condition forwardly of the compartment, and adapted to be drawn towards the rear of the compartment, the sides of the cover when so extended cooperating with the guideways and supported thereby.

A further object of the invention is the designing of a flexible cover adapted to close off the interior of an open type vehicle body, the sides of the body having double moulding strips mounted thereon which are provided with a channel extending therethrough adapted to cooperate with the sides of the flexible covering for supporting it when extended and which also affords drainage means for water upon the covering.

A still further object of the invention is the provision of a flexible cover for a compartment of a vehicle body of the open type, the covering being normally maintained in a collapsed condition and adapted to be extended so as to cooperate with the sides of the body to close off the interior thereof, means being associated with the covering for maintaining it in partially extended position, and other means being provided for locking the cover in any position desired.

Yet a further object of the invention is the devising of a flexible cover for an open type vehicle body, the covering adapted to be normally maintained in a collapsed position and to be extended towards the rear of the body so as to cooperate with the sides thereof to close off the interior, one end of the flexible cover being so constructed that a windshield may be mounted thereon.

With these and other objects in view, which may be incident to my improvements, the invention consists in the parts and combinations to be hereinafter set forth and claimed, with the understanding that the several necessary elements comprising my invention may be varied in construction, proportions and arrangement without departing from the spirit and scope of the appended claims.

The invention comprehends the provision of a flexible cover adapted to be associated with a vehicle of the open body type for closing off the interior of the body. One manner of practically effecting the concept of this invention is to provide a flexible covering strip, which is normally contained in a collapsed condition in a compartment towards the forward end of the vehicle, and which is adapted to be drawn therefrom to the rear of the vehicle so as to extend the cover. When the cover is in its extended position it cooperates with the sides of the vehicle body so as to close, or partially close off the interior thereof as desired. The invention also comprehends a construction of such nature that when the cover is in an extended position it prevents the opening of the doors of the body and also associates with the cover, means for locking it in any desired position.

In order to make my invention more clearly understood, I have shown in the accompanying drawings, means for carrying the same into practical effect without limiting the improvements in their useful applications to the particular constructions which, for the purpose of explanation, have been made the subject of illustration.

In the drawings:

Figure 1 is a partial broken away elevation of an automobile having the flexible cover of the invention associated therewith.

Figure 2 is a plan view of the vehicle disclosed in Figure 1.

Figure 3 shows a partial sectional elevation along the line 3—3 of Figure 1 and discloses a side of the vehicle body.

Figure 4 is a sectional elevation taken along the line 4—4 of Figure 3 and shows the interior of a side of the body.

Figure 5 is a partial sectional elevation showing in detail the locking feature of the cover and the construction of its containing compartment.

Figure 6 is a partial sectional elevation showing the end strip of the covering, the windshield mounted thereon and the means for maintaining the cover in partially closed positions.

Figure 7 is a perspective view of one form of flexible covering.

Figure 8 shows a perspective view of a vehicle with the cover and windshield associated therewith, the covering being in partially closed position.

Figure 9 is a sectional elevational view of a modified form of receiving compartment for the cover.

Figure 10 shows a sectional elevation of another form of cover from that disclosed in Figure 7.

Figure 11 is a vertical sectional elevation along the line 11—11 of Figure 10 and shows a side of the cover.

Figure 12 is a vertical sectional elevation disclosing another modification of the cover.

Figure 13 is a sectional view taken along the line 13—13 of Figure 12 and shows a side of the cover engaging the side of the body.

Throughout the drawings, similar reference numerals refer to like parts in the different views. There is shown in Figure 1 an automobile provided with an open body having sides 1, suitable doors 2 and a front and back seat designated by the reference numerals 3 and 4.

The invention resides in providing a flexible covering for the compartment or space between the rear and back seat of the tonneau of the car, this covering being so constructed that it may be rolled or collapsed within a suitable compartment when not in use, and can be easily withdrawn therefrom when desired. Such a covering, generally designated by the reference numeral 6, is disclosed in Figure 7 and comprises a flexible waterproof strip of material 7 upon which are secured, in any well known manner, covering sections or ribs 8. The strip 7 is of a width substantially equal to that of the car body and the ribs 8 extend across the full width of the strip.

It should be noted that the sides of the ribs are flared outwardly so that the width of the top of each rib is less than the width at the bottom. This construction allows the ribs to be folded or rolled and also provides a channel or passageway 9 between each rib, which as will hereinafter appear is employed for locking the cover in desired positions. Also to be noted is the fact that each rib, at each of its ends, has mounted thereon in any suitable manner, a projecting lug or block 10. As may be observed, each block 10 is provided with a recess in which is rotatably mounted about a vertical axis, a roller 11. As will be presently explained, these rollers function as anti-friction devices as the cover is drawn from or pushed into its compartment.

The strips 7 may be formed of any suitable waterproofed fibrous material or rubberized cloth or canvas, while the ribs 8, positioned thereon, may be constructed of any suitable sheet metal, preferably one having a low density. Suitable metals for the formation of the ribs may be found in the so-called rustless alloys, such for example as aluminum alloys, although pure aluminum may be employed if desired. The lugs or projections 10 positioned on each end of a rib may be formed of similar metal. In some instances, if desirable, it may be advantageous to form them integral with the rib instead of attaching them as shown.

For the purpose of containing and retaining the cover 6, when not in use, the rear of the front seat is provided with a compartment 12 having entrance thereto through the opening or longitudinal slot 13. In the construction shown in Figure 1, a suitable roller 14 is journalled into the sides of the body, and it is upon this roller that the flexible cover is collapsed or rolled. To aid in winding the cover upon its roller 14, the latter is provided with a spring, the tension of which is sufficient to take up any "slack" in the cover as it is rolled or collapsed. Positioned near the top of the compartment 12 is a second roller 15 which serves as a guide for the covering as it is pulled out of and is pushed into the compartment.

The main feature of the invention is not only in providing a cover for the tonneau or rear compartment of an open vehicle body, but also comprehends the provision of means for securing and supporting the edges of the cover and locking the covering in closed position so that the doors in the body will also be locked. To accomplish this the sides 1 of the car have secured thereto a lower railing or moulding 16, and an upper railing or moulding 17. As may be observed, the moulding extends along each side of the car body from the rear of the front seat cushion 3 backwardly towards the rear end of the vehicle.

In instances where the vehicle body tapers from its forward end to its rearward end, so that the width of the body adjacent the back of the front seat is less than the width at the rear seat, the mouldings may be tapered also in order to provide a greater width near the rear seat of the car, as indicated in Figure 2. By this construction, it will be appreciated that a rectangular shaped section, shown by the dotted lines in Figure 2, may be placed over the tonneau of the car and have its sides lie within the platform of the railings.

The mouldings 16 and 17 possess substantially a rectangular shaped cross section and they are so constructed that they fit flush with each other when placed in the position shown in Figure 3. In order to secure the mouldings to the sides of the body, screws 18 may be employed at suitable intervals to engage the wooden frame 19 at the top of the body side. In bodies of all metal constructions, it will be appreciated that similar fastening means may be employed. However, it is to be understood that the invention is in noways limited to the means for securing the railings to the car body, as any suitable fastenings may be employed without departing from the spirit of the invention and the scope of the appended claims.

From an inspection of Figure 3 it will be noted that the lower moulding 16 is provided with a recess 20 which extends longitudinally therethrough, while the upper moulding is provided with a cutaway portion which extends substantially to the inner side of the moulding and forms an arm 21 having an L-shaped section. The cutaway portion formed below the upright of the L and the recess 20 in the lower railing cooperate with each other to provide a channel or passageway 22 which extends through both mouldings.

The purpose of the projecting blocks 10 formed upon each covering rib as well as the rollers 11, will now be apparent. Each block member 10, when the cover is drawn towards the rear of the body, as may be seen in Figure 3, is engaged by the L-shaped arm 21, while the lower edge of the cover is supported by the lower railing 16. It should be noted that by reason of the shape of the upper and lower railings the cover edges with their projecting block members are positively retained in passages between the mouldings and can only be removed therefrom by moving the cover towards the compartment 14. Thus the mouldings form a supporting and retaining guideway or trackway for the sides or edges of the cover. By providing the rollers 11 in each block member so that they are in bearing with the inner surface of the base of the L-shaped arm, the cover may be moved through the guideways of the railings with little effort. To further facilitate this movement and to minimize the effect of friction between the sliding cover and the mouldings, suitable rollers 23 are mounted in recesses, formed in the lower railing 16, at convenient intervals so that they support the undersurface of the flexible cover.

The mouldings 16 and 17 may be made up in any lengths desired which are secured to the doors as well as to the body. It will hence be appreciated that in the operation of the cover it is merely pulled towards the rear or back of the vehicle body to extend it and when so extended, because of the arm 21 engaging the projections 10, it will be impossible to open the doors of the car.

It has been mentioned that the mouldings 16 and 17 extend from the front to the back seat. Across the rear of the body a modified form of moulding, adapted to receive the end of the flexible cover when in its extended position, is employed. This moulding may be formed of a plurality of members or it may be a single piece of material such as the moulding 64, shown in Figure 1. It may be observed that the moulding is provided with a suitable recess or channel 65, in the edge facing towards the front of the body, which is adapted to engage the end of the flexible cover when it is in its full extended position. When the cover is extended, as shown at Figure 1, it cooperates with the sides and doors of the body to entirely close off the interior of the tonneau thereof.

In some instances in the body construction, the body sides near the rear seat are above the top of the doors, as shown in the drawings. It will be appreciated that the flexible cover, forming the subject matter of this invention, is readily adapted to coach or body constructions of this type as well as to the type of body in which the top of the sides, as well as the door tops, lie in the same horizontal plane throughout their length.

Water upon the surface of the cover 6, will be conducted through the channels 9 between adjacent ribs and thence into the channel or passageway 22. At convenient intervals, conduits 24 for conducting water from the interior of the railings are provided. These conduits extend from the bottom of the passageway 22 vertically downwardly through the sides of the vehicle body and have their discharge ends positioned at any desired point below the body. The doors are also provided with a similar construction. In this instance, however, a second set of conduits (not shown), extending vertically through the lower edge of the door frame and the body, have their upper ends flush with the lower ends of the conduits extending through the doors themselves.

The rib section 25 nearest the free end of the covering strip, that is the end which is not secured to the roller 14 possesses a greater width than the ribs 8. This section is also of a heavier and stronger construction and has formed upon its outer side ears 26. Through these ears extends a shaft upon which is mounted a windshield 27, provided with wings 28. As may be observed, the inner side of the ears 26 are serrated, as shown at 29, and cooperate with the serrated edge of the windshield frame so that the shield may be maintained in any desired position. Suitable locking handles 29 are provided at each side of the windshield 27 in order to secure it in desired positions. The windshield support, it should be noted, allows the shield an arcuate movement of substantially 270° as may be observed in Figures 1, 5 and 8.

The upper surface of the rib section 25 is provided with a conically shaped recess 31 which provides a locking means, to be hereinafter explained. Upon the lower surface of the rib section 25 there is formed an engaging block member 32. A member 32 is provided upon each end of the rib section 25 and has formed therein a recess 33, in which is slidably mounted a piston 34 having an actuating handle 35 which extends through the opening 36 of the block. Also formed in the block is a second recess 38 in which is mounted a ball 37 pressed by the spring 38'. Ball 37 cooperates with conical shaped notches 39 formed in the plunger 34 and provides means for locking the plunger in any desired position. As may be observed the outer end 40 of the plunger cooperates with the recesses 41 formed in the inner edge of the lower moulding so as to maintain the cover in a partially closed position.

By providing a plurality of directly opposite recesses 41 on each inner side of the lower moulding, the cover will be maintained in desired positions upon the actuation of the plunger 34. Of course, any number of recesses placed at any desired interval may be employed. When the cover is positioned by a passenger within the tonneau, as disclosed in Figure 8, with the windshield upright and the wings thereof turned outwardly, it will be appreciated that substantially the effect of a closed body is obtained.

While the construction disclosed in Figure 6, affords a means for securing the cover in desired positions, it does not provide a locking device adapted to prevent the movement of the cover by unauthorized persons. To lock the cover in any desired position a lock 42, having a key 43, for operating the locking plunger 44, is positioned in the top of the compartment 12. In Figure 5 the cover is shown in its rolled position and completely contained within the compartment 12 with the windshield attached to the end strip turned downwardly and substantially parallel to the back of the front seat. In this position the recess 31 may be engaged by the plunger 44 of the lock, and movement of the cover prevented.

It should also be noted that the plunger 44 is of a width sufficient to engage the sides of adjacent rib sections. Thus, when the cover is partially extended, and the lock is actuated so as to force the plunger downwardly, the latter may be positioned between two adjacent ribs so as to lock the cover against movement. The rib sections are not placed over the flexible material strip for its full length, as may be noted in Figure 1. When the car body is entirely closed off with the cover in its fully extended position, the lock may be operated so as to release the plunger and place it in back of the last rib section remaining in the compartment, which results in securely locking the cover as well as the doors.

While only one lock has been disclosed, it is to be understood that a plurality of them may be positioned over the compartment if desired. Also suitable actuating tabs or thongs 45 formed of leather or other material may be secured to the upper surface of the ribs in any desired position.

In operation, assuming that the cover is in its rolled and collapsed condition, and it is desired to employ the same, the lock 42 is actuated so as to raise the plunger, and the windshield placed in an upright position. The side plungers 34 having been fully withdrawn into their recesses 33 the cover may be pulled towards the rear of the car body, either by a person within the tonneau of the car or by a person standing upon the running board thereof. In the former instance, the ears 26 may be grasped and the cover merely pulled towards the person within the tonneau. When the cover is extended to the desired degree, the side lugs 34 are actuated so as to engage the sides of the mouldings and the cover will be retained in this position. The windshield may then be positioned as desired, either up, as shown in Figure 8, or down as disclosed in Figure 1. If needed, the windshields may be turned outwardly. To roll up the cover, the windshield is placed in an upright position, if not already in such, the side plungers 34 released and the cover is pushed to roll it upon its receiving roller in the compartment 12. The cover having been collapsed it may again be locked against movement if desired, and the windshield can be left upright or turned down parallel to the front seat.

When it is desired to lock the cover from the outside, it being within its containing compartment, the lock 42 is released and the windshield positioned as described above. A person, standing upon the running board, may then, by grasping any of the tabs or thongs 45, pull the cover to its fully extended position, as shown in Figure 2. In this position the end 66 of the rib section 25 will be engaged by the channel in the rear moulding member 64. Upon the actuation of the lock 42 the cover will be locked and maintained in this position and consequently the doors of the body will also be securely locked. To release the cover so as to enter the car, the cover is unlocked and it is then pulled towards the front of the car so as to roll it up as previously explained.

Instead of employing the receiving roller 14 for the flexible cover, the structural practice disclosed in Figure 9 may be followed. As shown in Figure 9 the compartment 12' is extended under the front seat 3 of the vehicle. In place of the roller 14, a channel-like chute 45 constructed of sheet metal or other suitable material, is placed within the compartment. This channel comprises a top member 46, secured to the sides of the vehicle body in any convenient manner. Chute member 46 extends downwardly towards the bottom of the compartment 12', is bent upwardly at 47, and is thus continued until it touches the bottom of the front seat frame where it is bent over upon itself at 48, the free end thereof being secured to the floor boards 49 of the body.

The other member or side 50 of the channel is likewise secured to the sides of the vehicle body. It should be noted, however, that its upper end is secured to the back of the compartment 12', that is the face of the compartment nearest the rear seat and from thence is shaped so as to be parallel with the chute member 46. At its right hand end, as shown in the drawings, the channel is bent over upon itself and forms a complete cylinder 51. Where the chute or channel members 46 and 50 are parallel, the distances between them is such that the cover with the ribs secured thereto may pass freely through the channel-like container provided. In order to guide the cover as it enters and leaves the containing compartment 12', the guide roller construction 15 is employed.

When the construction of Figure 9 is associated with the vehicle body, the covering when in its collapsed condition, extends through the channel 45 and at the points 48 and 50 thereof follows the contour of the channel, its free end being turned over and substantially parallel to the floor boards. This form of the device may be operated in a manner similar to that outlined above.

In Figure 7 another form of rib construction is disclosed in which the ribs 52 formed of sheet metal by stamping or the like, are secured to the flexible strip 7. As disclosed in Figure 10, one side 53 of each rib projects downwardly, while its other side 54 is provided with an upward projection so that the opposite sides of adjacent ribs overlap each other. The end of each rib 52 as disclosed in Figure 11, is provided with a transverse channel portion 55 adapted to engage the upper moulding.

In Figure 12 still another form of flexible covering is disclosed. As shown the flexible material strip to which the covering strips are secured, is in this instance dispensed with. This may be accomplished by forming each rib 56 of sheet metal, one end thereof being turned downwardly as shown at 57 and rolled over upon itself to provide a hinge knuckle 58, while the other end 59 is left straight and is also turned over upon itself so as to form a hinge knuckle. Thus it may be seen that the passageway 57 of each rib is adjacent the straight portion of an adjacent rib. The hinge knuckles on the different ribs cooperate with each other as shown in Figure 13 and have a suitable hinge pin 60 extending through them.

A modified form of upper and lower moulding is shown in Figure 13, where the lower moulding 16' is provided with a recess portion 20' extending therethrough, while the upper moulding 17' has a T-shaped arm 61 instead of the L-shaped arm 21 of Figure 3. The ends of each rib 56 is turned over in a manner similar to that shown in Figure 11 so as to provide therein a transverse channel or recess 62 adapted to cooperate with the T-shaped arm 61. By providing suitable recesses 63 at convenient intervals in the lower moulding 16', the anti-friction rollers 23 may be mounted therein. Of course, if desired, rollers mounted upon a vertical axis may be recessed in the upper moulding so as to bear against the end of each rib as it passes adjacent to them.

It will be appreciated that the construction of Figure 10 or that of Figure 12 may be employed with the moulding of Figure 3 having the L-shaped arm. With either type of rib or moulding constructions the operation of the device will be the same as that previously outlined and all of the ribs will function to secure the doors in locked position when the covering is extended.

From the foregoing description it will be appreciated that I have provided a novel flexible covering for the rear compartments of vehicle bodies which besides being of simple and easy operation affords a water tight cover, as well as a means for locking the rear compartment so as to prevent entrance therein. Besides this function, the cover provides a means for attaching a windshield thereto so that the cover may be employed to protect the passengers in the vehicle from adverse weather conditions. Moreover, it will be appreciated that by the construction outlined above collection of dirt along the sides of the car, due to the construction details employed, is substantially prevented and water upon the cover is drained off, while the whole device presents an attractive and neat appearance.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a vehicle body of the open type provided with sides and doors, a flexible cover therefor, a lower and upper moulding member attached to the top of each side of said body and doors, the upper moulding member being substantially of a rectangular cross section provided with a cutaway portion extending therethrough forming an L-shaped arm, the sides of said flexible cover adapted to be supported and maintained within each of the channels formed in the upper moulding member between the base and the upright of the L-shaped arm adapted to abut the upright of said arm in lateral locking engagement when the cover is extended, said cover being normally maintained in a collapsed condition.

2. In a vehicle body of the open type provided with sides and doors, a flexible cover therefor, a lower and upper moulding member attached to the top of each side of said body and doors, said upper moulding member provided with a T-shaped arm extending for the full length of the member, the sides of the flexible cover adapted to engage the upright of the T-shaped arm when the cover is in extended positions to close off the body of the vehicle, said cover being normally maintained in a collapsed condition.

3. In a vehicle body of the open type provided with sides and doors, a flexible cover therefor, a lower and upper moulding member attached to the top of each side of said body and doors, the upper moulding member provided with an L-shaped arm, the lower moulding member provided with a recess directly below the cutaway portion of said arm formed by the upright of the L, said cutaway portion and said recess cooperating with each other to form a channel extending through each set of mouldings, the sides of said flexible cover adapted to be supported and maintaned within each of the said channels and hold the doors in a locked position when the cover is extended by engagement of the side of the cover with the upright portion of the L-shaped arm, said cover being normally maintained in a collapsed condition, and means connected to said channels for conducting any water collected therein through the car body.

4. In a vehicle body of the open type provided with sides and doors, a flexible cover therefor, a lower and upper moulding member attached to the top of each side of said body and doors, said upper moulding member being provided with a T-shaped arm, the lower member having a recess below the upright of the T of said arm, said T and said recess extending for the full length of the moulding along the sides of the body, the sides of the flexible cover adapted to engage the upright of the T-shaped arm when in extended positions to close off the body of the vehicle and maintain the doors in a locked position, said cover being normally maintained in a collapsed condition, and means connected to said channels for conducting any water collected therein through the car body.

5. In a vehicle body of the open type, a flexible cover therefor adapted to be normally maintained in a collapsed condition within a receiving compartment towards the forward end of said body, said cover comprising a flexible strip with a plurality or ribs secured to the surface thereof in spaced apart relation, each of the sides of said body and doors provided with a moulding having a channel extending therethrough, the rear of the body also provided with a moulding having a channel along its edge facing the forward end of the body, said cover adapted to be drawn towards the rear of the body so as to close off the interior thereof, means upon the sides of the cover engaging with said side mouldings for supporting the cover when so extended and locking the cover against lateral movement, the rib of the cover nearest the rear end of the body being so formed as to engage the moulding at the rear of the body when the cover is in fully extended position.

WILLIAM McMILLAN.